US008251286B2

(12) United States Patent
Hart et al.

(10) Patent No.: US 8,251,286 B2
(45) Date of Patent: Aug. 28, 2012

(54) SYSTEM AND METHOD FOR CONDUCTING SECURE PIN DEBIT TRANSACTIONS

(75) Inventors: Annmarie D. Hart, Seal Beach, CA (US); Lawrence R. Meyers, Rancho Palos Verdes, CA (US); Phillip A. McCauley, Carson, CA (US)

(73) Assignee: MagTek, Inc., Seal Beach, CA (US)

( * ) Notice: Subject to any disclaimer, the term of this patent is extended or adjusted under 35 U.S.C. 154(b) by 0 days.

(21) Appl. No.: 12/954,278

(22) Filed: Nov. 24, 2010

(65) Prior Publication Data
US 2011/0204140 A1 Aug. 25, 2011

Related U.S. Application Data (60) Provisional application No. 61/264,229, filed on Nov. 24, 2009.

(51) Int. Cl.
*G06K 5/00* (2006.01)
*G06K 7/01* (2006.01)
(52) U.S. Cl. ..... 235/380; 235/375; 235/379; 235/382.5; 235/383; 235/451; 235/492
(58) Field of Classification Search .................. 235/375, 235/380, 449, 451, 486, 492, 493, 379, 382.5, 235/383
See application file for complete search history.

(56) References Cited

U.S. PATENT DOCUMENTS

| 4,807,287 | A  | * | 2/1989  | Tucker et al. ................. 713/179 |
|-----------|----|---|---------|----------------------------------------|
| 5,367,572 | A  | * | 11/1994 | Weiss ............................. 713/184 |
| 5,920,628 | A  | * | 7/1999  | Indeck et al. ................... 360/25 |
| 6,246,769 | B1 | * | 6/2001  | Kohut ............................. 380/45 |
| 7,845,553 | B2 | * | 12/2010 | Holz et al. ..................... 235/379 |
| 2002/0128977 | A1 | * | 9/2002  | Nambiar et al. ................ 705/64 |
| 2008/0179401 | A1 | * | 7/2008  | Hart et al. ..................... 235/449 |
| 2009/0095812 | A1 | * | 4/2009  | Brown et al. .................. 235/380 |
| 2009/0284344 | A1 | * | 11/2009 | Craymer et al. ............. 340/5.54 |

OTHER PUBLICATIONS http://www.acculynk.com/index.html; "Acculynk"; Jul. 5, 2011; 1 page.
http://www.homeatm.net/oursolution.html; "HomeATM—Our Solution"; Jul. 5, 2011; 1 page.
http://www.nyce.net/SafeDebit_FinancialInstitution/index.htm; "SafeDebit Financial Institution"; Jul. 5, 2011; 1 page.

* cited by examiner

*Primary Examiner* — Tuyen K Vo
(74) *Attorney, Agent, or Firm* — Christie, Parker & Hale, LLP (57) ABSTRACT

The invention relates to a system for secure multi-factor authentication using dynamic data, the system including a card reader, and a computer having a display, wherein the card reader is configured to read card information from a data card, provide a scramble code to the computer, receive user input data indicative of user input responsive to a graphical numeric display based on the scramble code, generate PIN data based on the user input data, generate a PIN block including the PIN data and the card information, and transmit the PIN block for authentication.

20 Claims, 10 Drawing Sheets

| 2 | 7 | 7 | 5 | 0 | 2 | 8 | C | 4 | E | B | C | 1 | 5 | B | D |
|---|---|---|---|---|---|---|---|---|---|---|---|---|---|---|---|
| C | 1 | C | 0 | E | C | E | 3 | 4 | 3 | 6 | 7 | 5 | 9 | 4 | 8 |
| 6 | D | 8 | 5 | A | C | 6 | 5 | E | 7 | D | 0 | F | C | C | E |
| 8 | 9 | 2 | 5 | D | D | 2 | 5 | 8 | 4 | 1 | 6 | 8 | 5 | 3 | 9 |
| 9 | 8 | 3 | 0 | 5 | 4 | 7 | 8 | 6 | 9 | F | E | 3 | 9 | 8 | 7 |
| 6 | 5 | 9 | 6 | 3 | 0 | 4 | F | E | 5 | 6 | 2 | 4 | 9 | 3 | 0 |
| 3 | 8 | 6 | 9 | 2 | 3 | C | 6 | 5 | E | 7 | 9 | 2 | C | 6 | 9 |
| 0 | 6 | 9 | 3 | 6 | 2 | 3 | 6 | C | 1 | 7 | 2 | D | D | 2 | 5 |
| 1 | 8 | 6 | 3 | 9 | 8 | F | F | F | B | F | 1 | 4 | 9 | 5 | 6 |
| 5 | 2 | 5 | 6 | 9 | 8 | C | 6 | B | D | 1 | 2 | 5 | A | 5 | F |
| 4 | 8 | 0 | 5 | 4 | 9 | 6 | 3 | 9 | 8 | 0 | 2 | 2 | 4 | 6 | 3 |
| 8 | 5 | 3 | 9 | 8 | 7 | 3 | 6 | 9 | 2 | 0 | 5 | 8 | 9 | 2 | 5 |
| 7 | 5 | 3 | 6 | 8 | 0 | 2 | 5 | 0 | 8 | 0 | 6 | 1 | 8 | 6 | 3 |
| 6 | 3 | 9 | 5 | 8 | 4 | 1 | 0 | 2 | 6 | 5 | 9 | 5 | 2 | 5 | 6 |
| 9 | 7 | 4 | F | 0 | 0 | 4 | 5 | 0 | 6 | 9 | 0 | 4 | 8 | 0 | 5 |
| 2 | 3 | 0 | 6 | 9 | 8 | 5 | 6 | 0 | 2 | 5 | 0 | 8 | 5 | 3 | 9 |

| | | | | | | | | | | | | | |
|---|---|---|---|---|---|---|---|---|---|---|---|---|---|
| 2 | 7 | 7 | 5 | 0 | 2 | 8 | C | 4 | E | B | C | 1 | 5 | B | D |
| C | 1 | C | 0 | E | C | E | 3 | 4 | 3 | 6 | 7 | 5 | 9 | 4 | 8 |
| 6 | D | 8 | 5 | A | C | 6 | 5 | E | 7 | D | 0 | F | C | C | E |
| 8 | 9 | 2 | 5 | D | D | 2 | 5 | 8 | 4 | 1 | 6 | [8] | 5 | 3 | 9 |
| 9 | 8 | 3 | 0 | 5 | 4 | [7] | 8 | 6 | 9 | F | E | 3 | 9 | 8 | 7 |
| 6 | 5 | 9 | 6 | 3 | 0 | 4 | F | E | 5 | 6 | 2 | 4 | 9 | 3 | 0 |
| 3 | 8 | 6 | 9 | 2 | 3 | C | 6 | 5 | E | 7 | 9 | 2 | C | 6 | 9 |
| 0 | 6 | 9 | 3 | 6 | 2 | 3 | 6 | C | 1 | [7] | 2 | D | D | 2 | 5 |
| 1 | 8 | 6 | 3 | 9 | 8 | F | F | F | B | F | 1 | 4 | 9 | 5 | 6 |
| 5 | 2 | 5 | 6 | 9 | 8 | C | 6 | B | D | 1 | 2 | 5 | A | 5 | F |
| 4 | 8 | 0 | 5 | 4 | 9 | 6 | 3 | 9 | 8 | 0 | 2 | 2 | 4 | 6 | 3 |
| 8 | 5 | 3 | 9 | 8 | 7 | 3 | 6 | 9 | 2 | 0 | 5 | 8 | 9 | 2 | 5 |
| 7 | 5 | 3 | 6 | 8 | 0 | 2 | [5] | 0 | 8 | 0 | 6 | 1 | 8 | 6 | 3 |
| 6 | 3 | 9 | 5 | 8 | 4 | 1 | 0 | 2 | 6 | 5 | 9 | 5 | 2 | 5 | 6 |
| 9 | 7 | 4 | F | 0 | 0 | 4 | 5 | 0 | 6 | 9 | 0 | 4 | 8 | 0 | 5 |
| 2 | 3 | 0 | 6 | 9 | 8 | 5 | 6 | 0 | 2 | 5 | 0 | 8 | 5 | 3 | 9 |

PIN = 5778

| 2 | 7 | 7 | 5 | 0 | 2 | 8 | C | 4 | E | B | C | 1 | 5 | B | D |
|---|---|---|---|---|---|---|---|---|---|---|---|---|---|---|---|
| C | 1 | C | 0 | E | C | E | 3 | 4 | 3 | 6 | 7 | 5 | 9 | 4 | 8 |
| 6 | D | 8 | 5 | A | C | 6 | 5 | E | 7 | D | 0 | F | C | C | E |
| 8 | 9 | 2 | 5 | D | D | 2 | 5 | 8 | 4 | 1 | 6 | 8 | 5 | 3 | 9 |
| 9 | 8 | 3 | 0 | 5 | 4 | 7 | 8 | 6 | 9 | F | E | 3 | 9 | 8 | 7 |
| 6 | 5 | 9 | 6 | 3 | 0 | 4 | F | E | 5 | 6 | 2 | 4 | 9 | 3 | 0 |
| 3 | 8 | 6 | 9 | 2 | 3 | 5 | 3 | 9 | 8 | 8 | 9 | 2 | C | 6 | 9 |
| 0 | 6 | 9 | 3 | 6 | 2 | 5 | 3 | 6 | 8 | 4 | 2 | D | D | 2 | 5 |
| 1 | 8 | 6 | 3 | 9 | 8 | 3 | 9 | 5 | 8 | 0 | 1 | 4 | 9 | 5 | 6 |
| 5 | 2 | 5 | 6 | 9 | 8 | 7 | 4 | F | 7 | 8 | 9 | E | A | 5 | F |
| 4 | 8 | 0 | 5 | 4 | 9 | 6 | 3 | 9 | 4 | 5 | 6 | N T | 4 | 6 | 3 |
| 8 | 5 | 3 | 9 | 8 | 7 | 3 | 6 | 9 | 1 | 2 | 3 | E R | 9 | 2 | 5 |
| 7 | 5 | 3 | 6 | 8 | 0 | 2 | 5 | 0 | C | 0 |   |   | 8 | 6 | 3 |
| 6 | 3 | 9 | 5 | 8 | 4 | 1 | 0 | 2 | 6 | 5 | 9 | 5 | 2 | 5 | 6 |
| 9 | 7 | 4 | F | 0 | 0 | 4 | 5 | 0 | 6 | 9 | 0 | 4 | 8 | 0 | 5 |
| 2 | 3 | 0 | 6 | 9 | 8 | 5 | 6 | 0 | 2 | 5 | 0 | 8 | 5 | 3 | 9 |

SYSTEM AND METHOD FOR CONDUCTING SECURE PIN DEBIT TRANSACTIONS

CROSS-REFERENCE TO RELATED APPLICATION(S)

The present application claims priority to and the benefit of Provisional Application No. 61/264,229, filed Nov. 24, 2009, entitled "SYSTEM AND METHOD FOR CONDUCTING SECURE PIN DEBIT TRANSACTIONS", the entire content of which is incorporated herein by reference.

FIELD

The present invention relates to a system and method enabling secure PIN debit transactions. More specifically, it relates to multi-factor authentication systems and methods for conducting secure PIN debit transactions by protecting confidential user and data card information from unsecure environments.

BACKGROUND

In the field of Internet e-commerce payments, there is a desire to provide PIN debit payment functions rather than the more typical credit card payments. Merchants prefer PIN debit transactions over credit transactions because they enjoy substantial cost savings in the fees charged by the processing companies. For example, on a $100 purchase, a merchant may need to pay a 2% interchange fee ($2.00) for a credit transaction while a PIN debit transaction for the same purchase may require a flat fee of $0.50. Therefore, brick and mortar merchants often attempt to steer consumers toward paying with a debit card/PIN transaction. Research suggests that consumers have little preference between paying with credit versus PIN debit.

However, PIN debit transactions have typically only been available via brick and mortar retail locations that use an expensive certified PIN entry device (PED) PIN pad and/or a magnetic stripe card reader device. The high cost of these secure PIN pads and card readers has prevented these devices from being more widely adopted. Therefore, there is a need for a secure, low cost PIN data entry system.

Prior attempts to solve this problem in the form of a purely software system have had significant limitations. Such systems require the user to manually enter both account numbers and PIN data into a computer system, which renders them susceptible to the interception of private data by malicious software such as keystroke loggers or other security weaknesses within the computer system. Furthermore, there is an increased risk that a hacker could steal both the account data and PIN data because both are simultaneously located in the computer system's memory during the transaction.

SUMMARY

Aspects of the invention relate to multi-factor authentication systems and methods for conducting secure PIN debit transactions by protecting confidential user and data card information from unsecure environments. Some embodiments of the invention provide a multi-factor authentication system and method where a card reader and a computer having a display create and present a virtual PIN pad which can be used by a user to enter PIN data in an obfuscated or encoded manner. The obfuscated PIN data can then be transmitted to the card reader, which decodes (or de-obfuscates) the PIN data, combines it with data from a data card, and securely authenticates the PIN data with the data from the data card. This method can be more secure than the purely software solution described in the background above since the PIN number and the account number are not simultaneously stored in an unencrypted form on the computer, which may be unsecure from malicious software. In addition, the card reader can provide additional security by reading and authenticating intrinsic physical characteristics of the data card. Embodiments of the card reader can be less expensive than the purely hardware portable PIN entry system, in part because the system does not require a physical keypad. Embodiments of the card reader can also include a tamper resistant security module (TRSM) for preventing any tampering with the reader. The TRSM can include tamper resistance protections, tamper evident protections, tamper responsive protections, and other appropriate protections.

In one embodiment of the invention, the invention relates to a system for secure multi-factor authentication using dynamic data, the system including a card reader, and a computer having a display, wherein the card reader is configured to read card information from a data card, the card information including an account number, generate and provide a scramble code to the computer based on the card information, receive user input data indicative of user input responsive to a graphical numeric display based on the scramble code, generate personal identification number (PIN) data based on the user input data, where the PIN data is configured for use in multiple transactions, generate a PIN block including the PIN data and the account number, and transmit the PIN block for authentication.

In another embodiment of the invention, the invention relates to a method for secure multi-factor authentication using dynamic data, the method including reading, at a card reader, card information from a data card, the card information including an account number, generating and sending, at the card reader, a scramble code based on the card information to a computer having a display, receiving, at the card reader, user input data indicative of user input responsive to a graphical numeric display based on the scramble code, decoding, at the card reader, personal identification number (PIN) data from the user input data, where the PIN data is configured for use in multiple transactions, generating, at the card reader, a PIN block including the PIN data and the account number, and transmitting, at the card reader, the PIN block for authentication.

DETAILED DESCRIPTION

Referring now to the drawings, embodiments of the invention generally involve systems and methods for conducting secure PIN debit transactions by protecting confidential user and data card information from unsecure environments. In several embodiments, the system includes a card reader that reads data from a data card, receives personal identification number (PIN) data via a virtual PIN pad presented on a computer coupled with the reader, combines the card data with the PIN data to produce a PIN block, and authenticates the PIN block. In a number of embodiments, the systems and methods described herein can verify both what the user has (a physical data card) and what the user knows (the PIN associated with the data card) and therefore can be considered multi-factor authentication systems and methods. These embodiments can be more secure than the purely software solutions described in the background section above because the PIN number and the account number are not simultaneously stored in an unencrypted form on an unsecure computer system, and because the card reader can provide additional security by making use of unique physical characteristics of the data card. Embodiments of these systems and methods are also generally less expensive than the purely hardware portable PIN entry system, in part because these systems and methods do not require a physical keypad.

Various embodiments of the invention also provide for dynamic data authentication. In several embodiments, the card readers can read data from a magnetic stripe card that includes an intrinsic magnetic characteristic of the data card that can be used to uniquely identify the data card. In such case, a unique magnetic fingerprint based on the intrinsic magnetic characteristic can be extracted from the card. The intrinsic magnetic characteristic, and correspondingly the unique magnetic fingerprint, are stochastic in nature. Thus, each fingerprint read from the card is slightly different from other fingerprints read from the same card (e.g., dynamic data). However, correlation techniques allow for card authentication by determining whether a threshold degree of correlation has been met. Thus, embodiments of the invention can include card readers that provide dynamic data which can be authenticated using correlation techniques. The stochastic nature of the magnetic fingerprint can provide a particular heightened level of security in a financial data card transaction making it more difficult for financial data associated with the transaction to be stolen or otherwise compromised.

Figure 1:
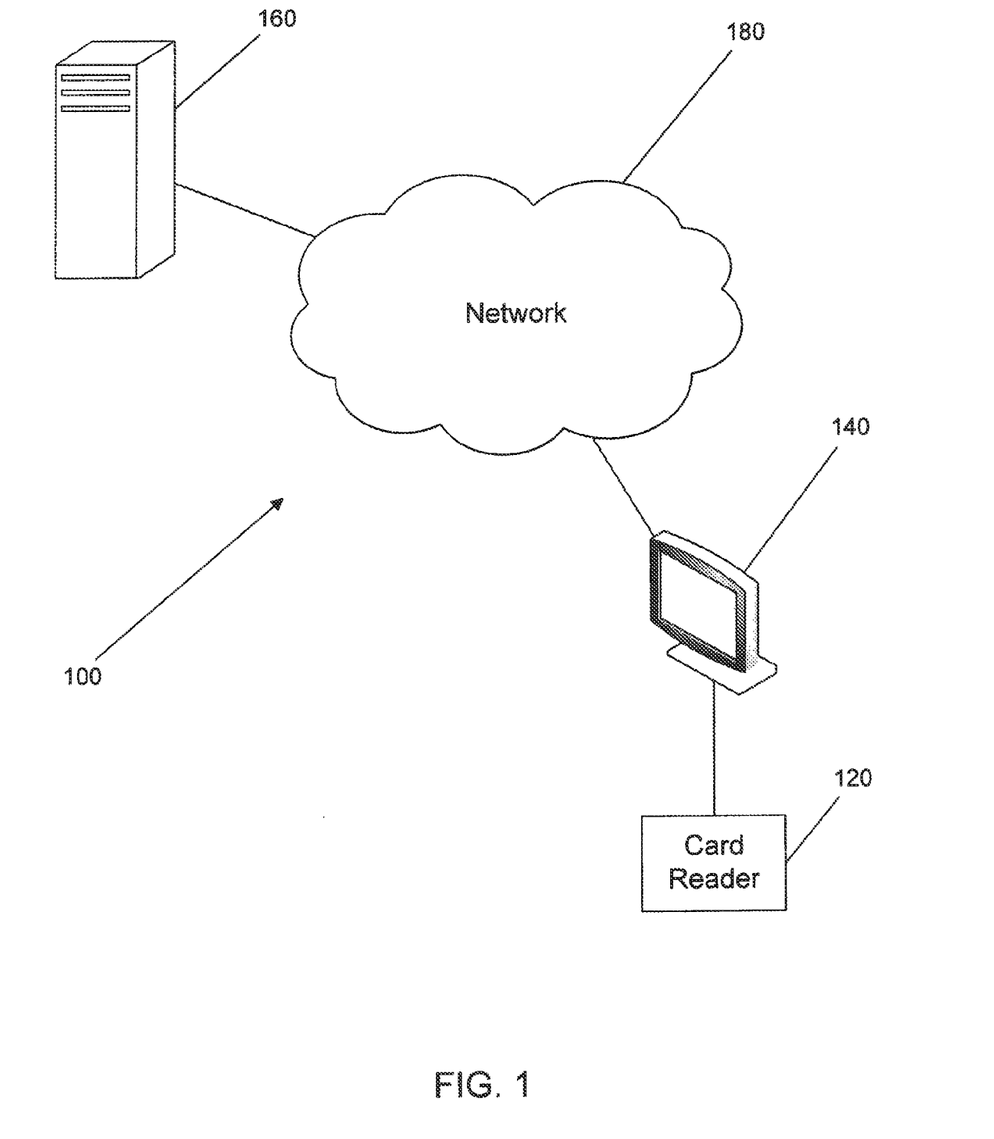
FIG. 1 is a schematic block diagram of a card transaction system including a card reader and a client computer with a display in accordance with an embodiment of the invention.

FIG. 1 is a schematic block diagram of a card transaction system 100 including a card reader 120 and a client computer 140 with a display in accordance with an embodiment of the invention. The multi-factor authentication system 100 includes, in part, a card reader 120 which communicates with computer 140 over a data connection. Computer 140, in turn, is connected to a network 180. Computer 140 communicates over network 180 with server 160.

The computer 140 may be a personal desktop or laptop computer, a personal cellular phone, a smartphone, a personal digital assistant (PDA), an internet tablet, a video game console, a multimedia playback device, a public payphone, a point of sale device, an automobile, a vending machine, a kiosk, or any other machine which may be configured to communicate with the card reader. The server 160 may refer to a single server or a cluster of servers providing the same or different functionality. The server 160 may be running any operating system, such as variants of Windows, Linux, BSD, or OS X. The server may also be connected to the network behind a firewall, within a virtual private network, or otherwise protected from direct access via the network 180. The network 180 may be any sort of communications network which is capable of carrying transaction information such as the Internet, a telephone network, a satellite network, or a combination of these networks. Other suitable variations of these components may also be used.

Figure 2:
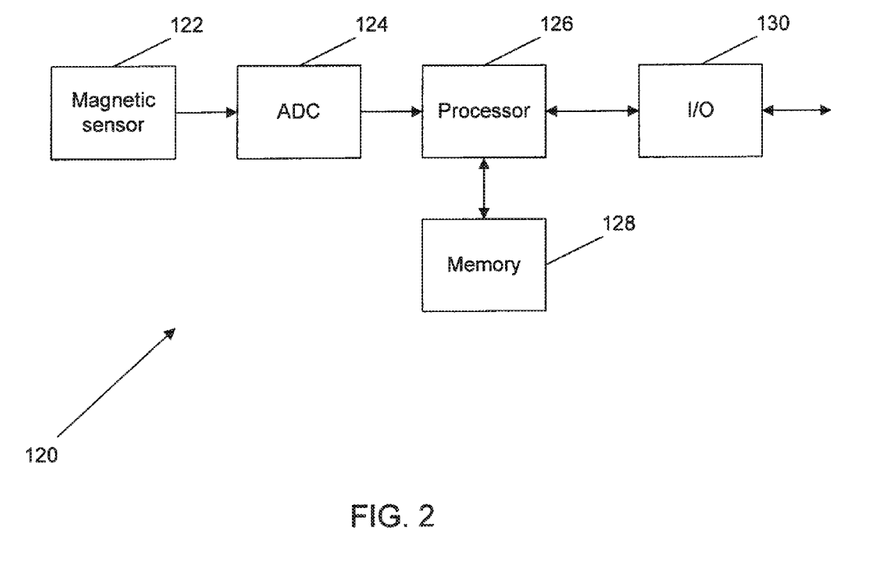
FIG. 2 is schematic block diagram of a card reader in accordance with an embodiment of the invention.

FIG. 2 is a high level schematic block diagram of the card reader 120 in accordance with one embodiment of the present invention. The card reader 120 includes a magnetic sensor 122, an analog-to-digital converter (ADC) 124, a processor 126, a memory 128 and a input/output interface/unit 130. Magnetic sensor 122 is connected to analog-to-digital converter (ADC) 124, which in turn is connected to processor 126. Processor 126 is connected to memory 128 and input/output (I/O) unit 130.

In one embodiment of the present invention, magnetic sensor 122 reads analog magnetic information stored on the magnetic stripe of a data card (such as the type commonly used for credit cards) and outputs an analog representation of this magnetic information to the ADC 124. ADC 124 converts the analog information received from the magnetic sensor into a digital representation and transmits the digital representation of the magnetic data to processor 126. Processor 126 stores the digital information in memory 128. Processor 126 is configured to communicate with I/O unit 130, which allows the card reader to communicate with the computer and/or other external devices over a data connection such as RS 232, RS 422, RS 485, EIA 530, Ethernet, USB, Bluetooth, WiFi, or another protocol for connecting communications equipment, as is well known in the art.

In some embodiments of the invention, magnetic sensor 122 and ADC 124 may be a single unit which performs both the functions of sensing the information contained within the magnetic stripe and converting the analog information into a digital representation.

The processor 126 may be any sort of microprocessor suitable for use in an embedded system, such as a Z80 or an x86-based processor, as is well known in the art. In other embodiments, the ADC 124, the processor 126, the memory 128, and the I/O unit 130 or some subset of these may be implemented using a single microcontroller chip such as a PIC, AVR, or ARM chip, as is well known in the art. In some embodiments, the processor can be a secure microcontroller. The secure microcontroller can include protection services and features such as tamper detection, memory clear corresponding to detected tampering or other security related events, and other helpful tamper protection services.

In some embodiments, the card reader may additionally include a discrete unit for encryption, which, for the purposes of FIG. 2, can be considered as being part of the processor 126.

Figure 3:
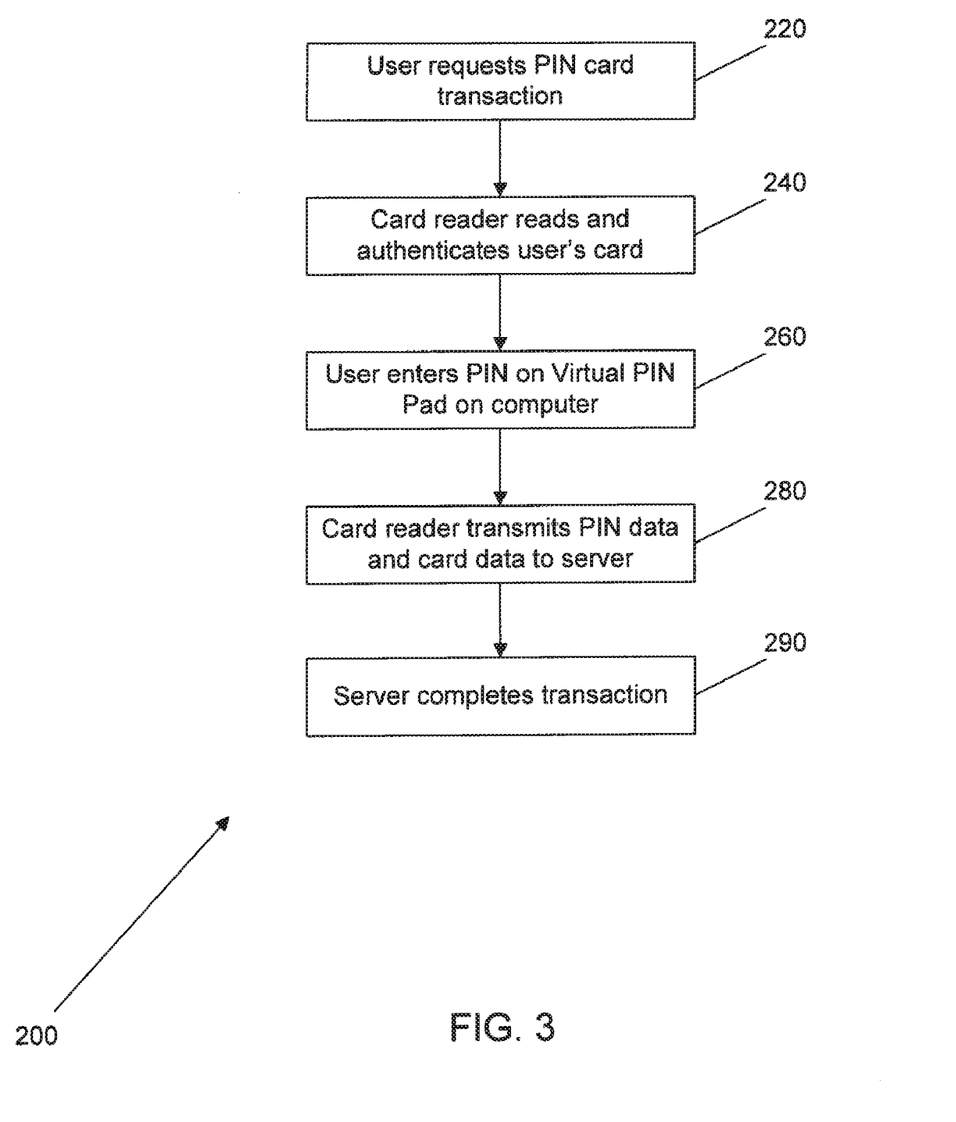
FIG. 3 is a flowchart of a general process that can be used to conduct a transaction with the card transaction system of FIG. 1 in accordance with an embodiment of the invention.

FIG. 3 is a flowchart of a general process 200 that can be used to conduct a transaction in accordance with an embodiment of the invention. The general process 200 includes a number of subprocesses including a user requesting (220) a PIN card transaction, a card reader reading and authenticating (240) the user's card, the user entering (260) his or her PIN on a virtual PIN pad (e.g., graphical numeric display) on a computer, the card reader securely transmitting (280) the PIN data and card data to a server, and the server authenticating the PIN and card data and completing (290) the transaction.

In one embodiment, the process can perform the sequence of actions in any order. In another embodiment, the process can skip one or more of the actions. In other embodiments, one of more of the actions are performed simultaneously. In some embodiments, additional actions can be performed.

Figure 4:
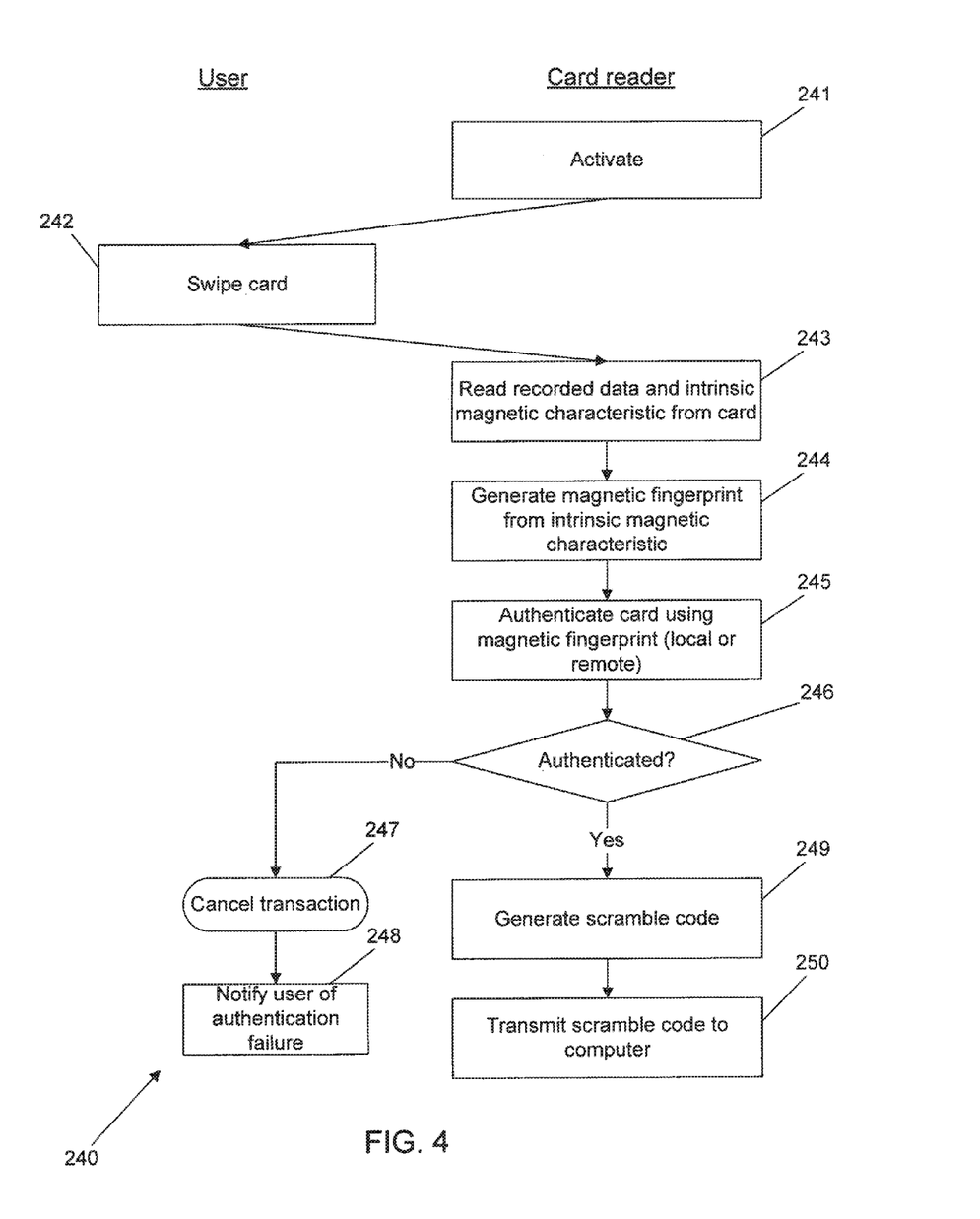
FIG. 4 is a flowchart depicting a subprocess that can be used with the general process of FIG. 3 for reading and authenticating a user's card in accordance with one embodiment of the invention.

FIG. 4 is a flowchart depicting a subprocess 240 that can be used with the general process of FIG. 3 for reading and authenticating the user's card in one of the embodiment of the invention. In a first action, the card reader can activate (241), in some embodiments, in response to a signal that the user is requesting a PIN card transaction. In other embodiments, the card reader is activated when it detects that the user is attempting to swipe a card. The user can then swipe (242) the card and the card reader can read (243) the data recorded on the magnetic stripe of the card. The data recorded on the card generally includes information such as a name, an account number, an expiration date, but may generally contain any sort of data.

In some embodiments, reading the card also involves reading an intrinsic physical characteristic of the card such as an intrinsic magnetic characteristic of the card. In such embodiments, the card reader reads an intrinsic magnetic characteristic from the magnetic stripe while the card is being swiped and the card reader generates (244) a digital representation of the intrinsic magnetic characteristic, which can be referred to as a magnetic fingerprint (e.g., dynamic data). Systems and methods for reading and generating magnetic fingerprint information suitable for use in conjunction with one embodiment of the present invention are described in U.S. Pat. Nos. 6,098,881, 7,478,751, 7,210,627, 7,377,433, 7,703,676, and 7,673,799, the entire content of each is hereby incorporated by reference. The magnetic fingerprint information can provide dynamic data per transaction which can be authenticated using correlation techniques. The stochastic nature of the magnetic fingerprint can provide a level of security in the transaction thereby making it more difficult for financial data associated with a card based transaction to be stolen or otherwise compromised. For example, in some embodiments, the use of the dynamic data can prevent man-in-the-middle attacks or other attempts to acquire confidential transaction information.

Returning now to FIG. 4, the card reader can then authenticate (245) the card using the magnetic fingerprint, either against a local database of known authentic magnetic fingerprints or against a remote database of known authentic magnetic fingerprints. If the card is not authenticated (246), then the card reader can then cancel (247) the transaction and notify (248) the user of the transaction failure. In some embodiments, the user is notified with a signal on the card reader (e.g., such as a red indicator light on the card reader or tactile feedback) and/or a notice is displayed on the display of the computer. If the card is authenticated (246), the card reader can generate (249) a scramble code and transmit (250) the scramble code to the computer. In other embodiments, the card reader does not initially authenticate the card using the magnetic fingerprint, but instead immediately generates a scramble code after the card is swiped. In a number of embodiments, the scramble code is information from which a computer can generate a graphical numeric display or virtual PIN pad enabling a user to enter a PIN. In some embodiments, the scramble code can be the basis for a numerical matrix. In a number of embodiments, the numerical matrix can be thought of as a scattergram.

In one embodiment, the process can perform the sequence of actions in any order. In another embodiment, the process can skip one or more of the actions. In other embodiments, one of more of the actions are performed simultaneously. In some embodiments, additional actions can be performed.

Figure 5:
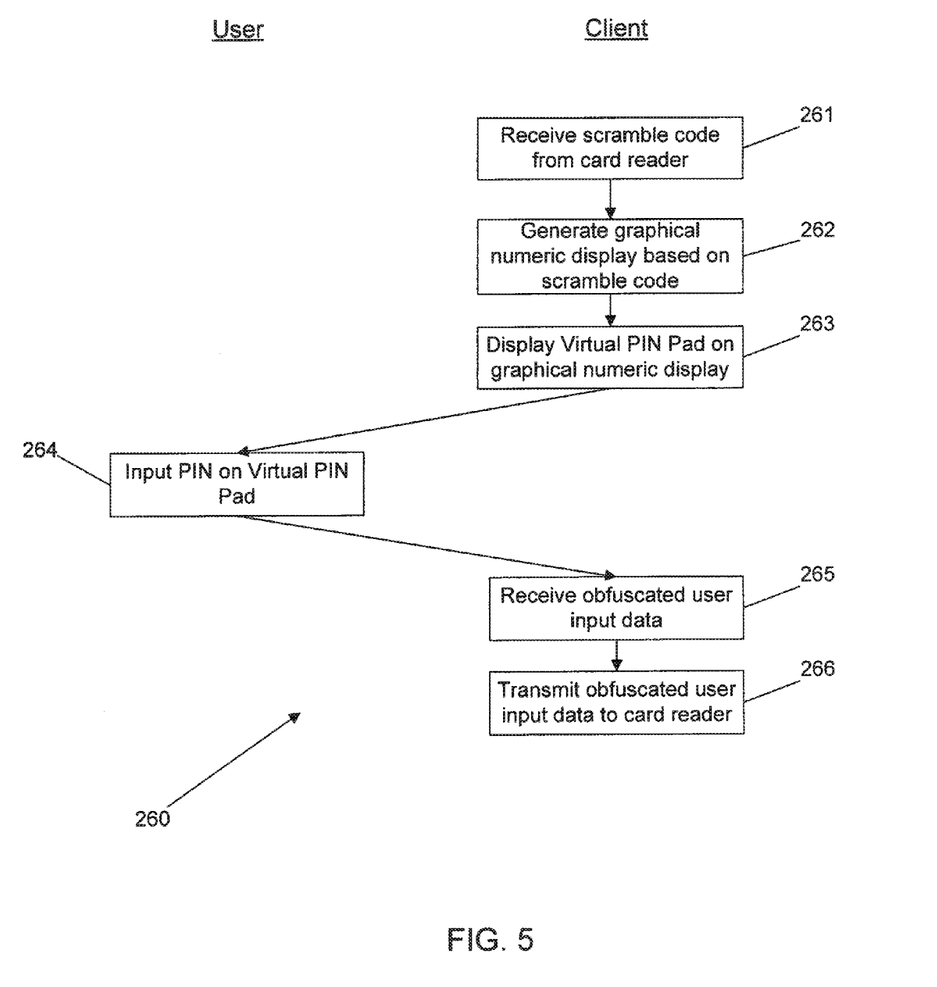
FIG. 5 is a flowchart depicting a subprocess that can be used with the general process of FIG. 3 for entering a PIN on a virtual PIN pad on the client computer in accordance with one embodiment of the invention.
Figure 8:
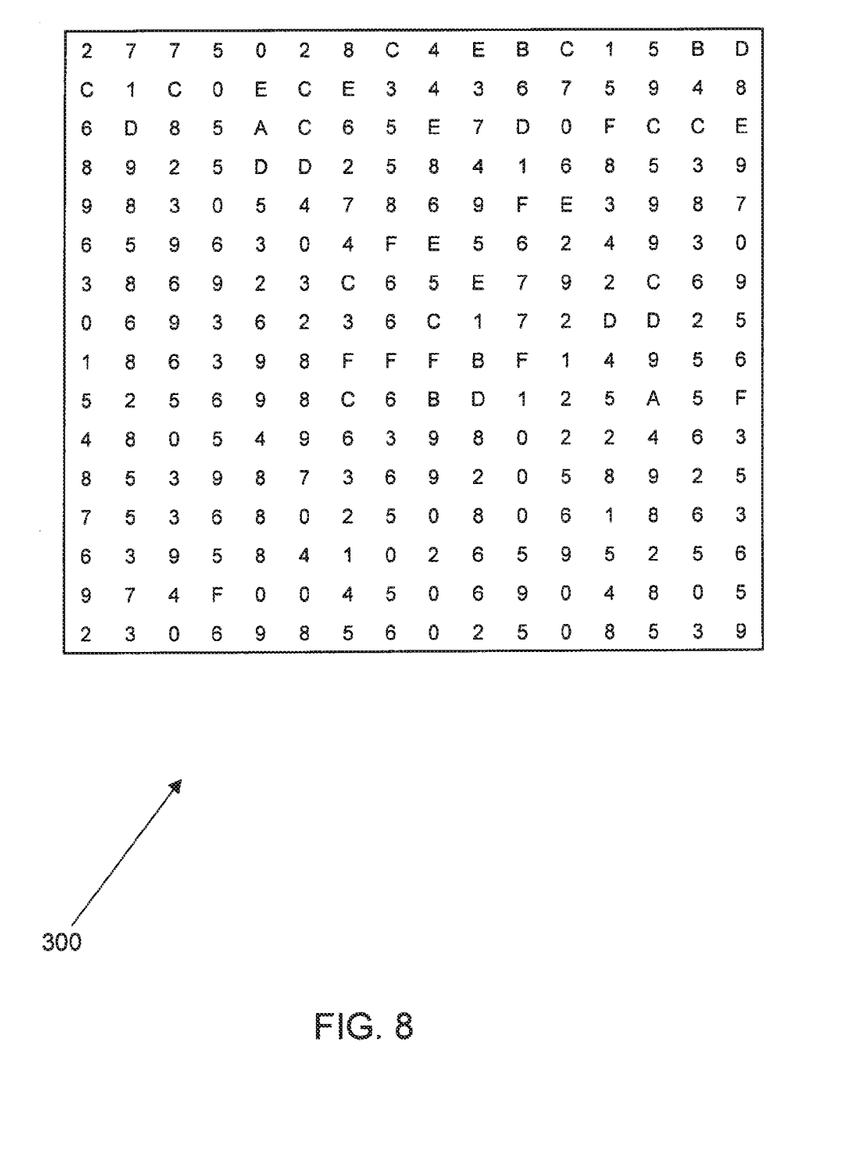
FIG. 8 is an example of a scattergram that can be used with the subprocess of FIG. 5 to enter a PIN accordance with an embodiment of the invention.

FIG. 5 is a flowchart depicting a subprocess 260 that can be used with the general process of FIG. 3 for entering a PIN on a virtual PIN pad on the client computer in accordance with one embodiment of the invention. The subprocess 260 can begin when the client computer receives (261) a scramble code from the card reader. The computer can then generate (262) a graphical numeric display (e.g., scattergram) in a pseudo-random manner using the scramble code. As is well known in the art, the pseudo-random generator can be an algorithm which deterministically produces values which appear to be random based on a particular seed (e.g., the Mersenne twister is a pseudo-random generator). FIG. 8 is an example of a graphical numeric display (e.g., scattergram) 300 that can be used with the subprocess of FIG. 5 to enter a PIN in accordance with an embodiment of the invention. Returning now to FIG. 5, the computer can then display (263) a virtual PIN pad with the graphical numeric display and a user can input (264) a PIN via the displayed scattergram.

Figure 9:
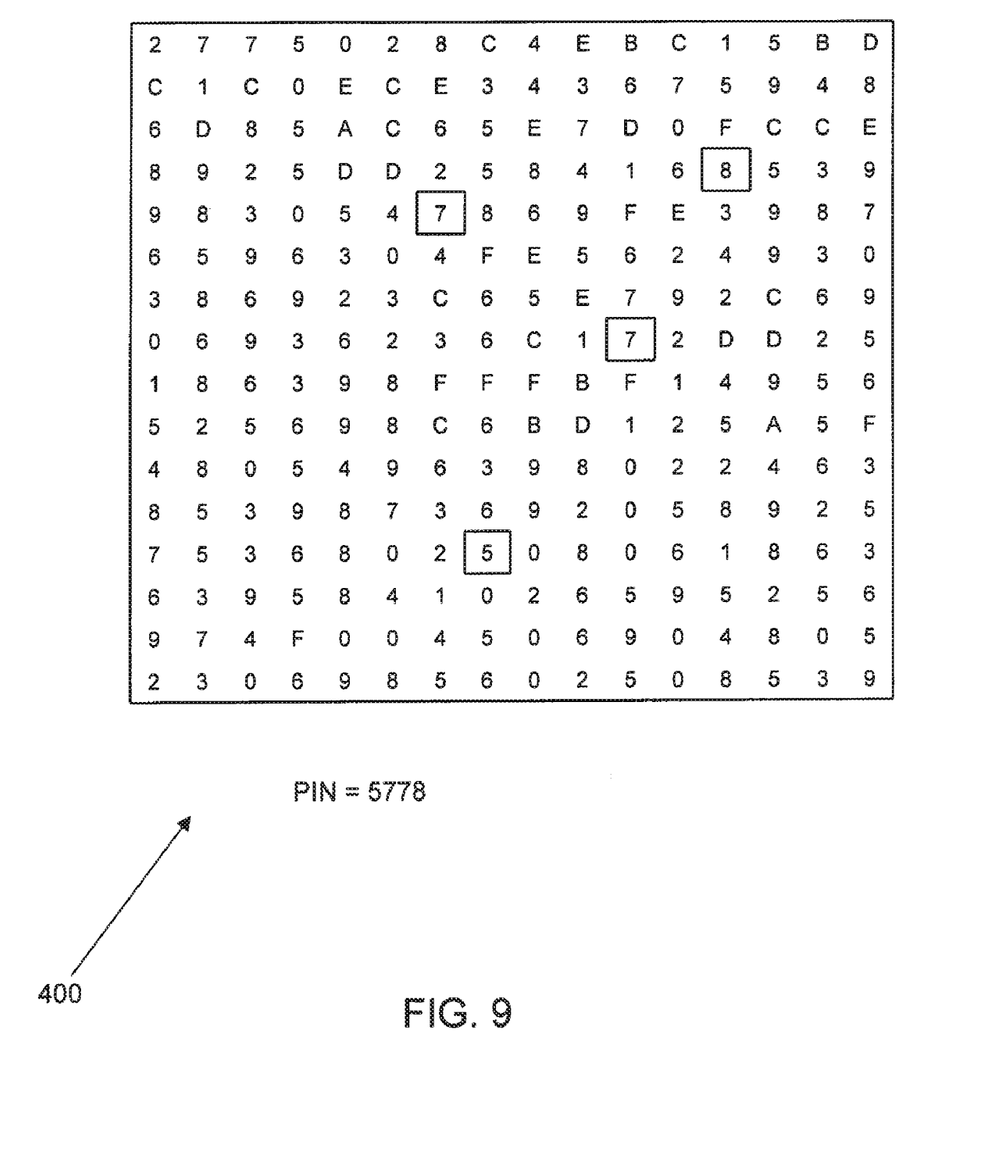
FIG. 9 shows the scattergram of FIG. 8 while a PIN code is entered on the virtual PIN pad scattergram in accordance with an embodiment of the invention.

In some embodiments, the scattergram includes multiple instances of each of the possible digits in a PIN (e.g., the digits 0 through 9). For example, FIG. 9 depicts a scattergram 400 generated for a system where a PIN is a sequence of hexadecimal digits from 0 to F. In FIG. 9, the user has entered the PIN "5778" by locating and selecting, in order, an instance of each digit in his or her pin on the scattergram. In some embodiments, the system prevents the user from selecting any particular instance of a digit more than once. In FIG. 9, the selection of each particular instance of the digits 5, 7, 7, and 8 has caused those squares to change in appearance. In some embodiments, this may indicate that those squares may not be selected again.

Figure 10:
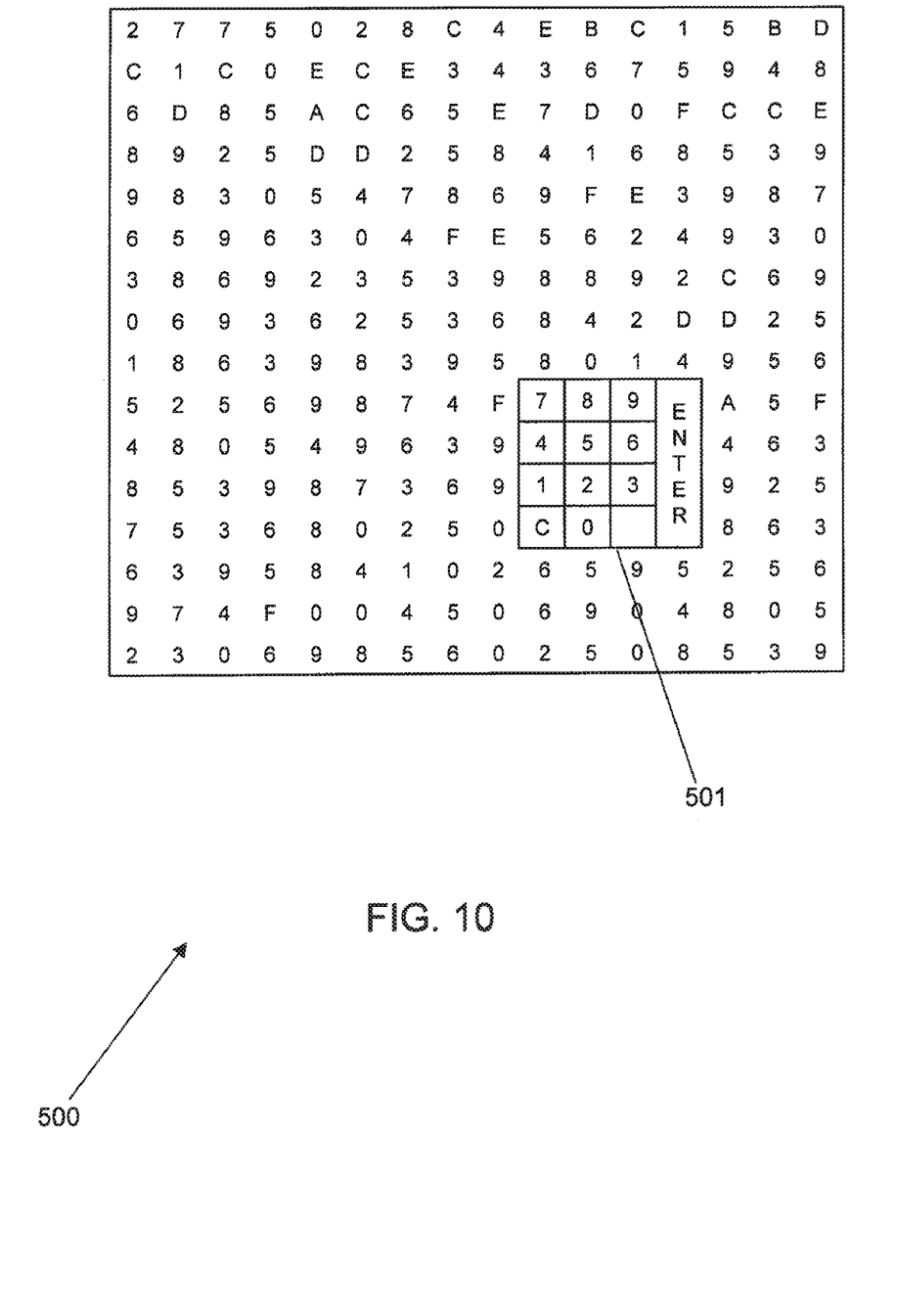
FIG. 10 shows the scattergram of FIG. 8 with an overlaid PIN pad matrix while a PIN code is entered on the virtual PIN pad in accordance with another embodiment of the invention.

In another embodiment, a PIN pad is overlaid in a pseudo-random location on top of the scattergram which was pseudo-randomly generated using the scramble code, as shown, for example, in FIG. 10, where PIN pad 501 has been overlaid over a portion of the right side of the scattergram 500. In a number of embodiments, each possible digit (e.g., 0-9) is repeated at least a preselected number of times. For example, in one embodiment, the digits are repeated at least four times to correspond with a PIN having four digits. In several embodiments, since the computer does not know the content of the scattergram, it is unable to determine which PIN digits a user may have entered.

Returning to the process of FIG. 5, the computer can receive (265) user input data, which is an obfuscated or encoded representation of the user's PIN, and can then transmit (266) this obfuscated/encoded user input data to the card reader. In many embodiments, the computer records the PIN data entered by the user in terms of coordinates on the scattergram. This coordinate data is then transmitted to the card reader. The card reader can then use the coordinate data and scramble code to determine which numbers the user selected.

Figure 6:
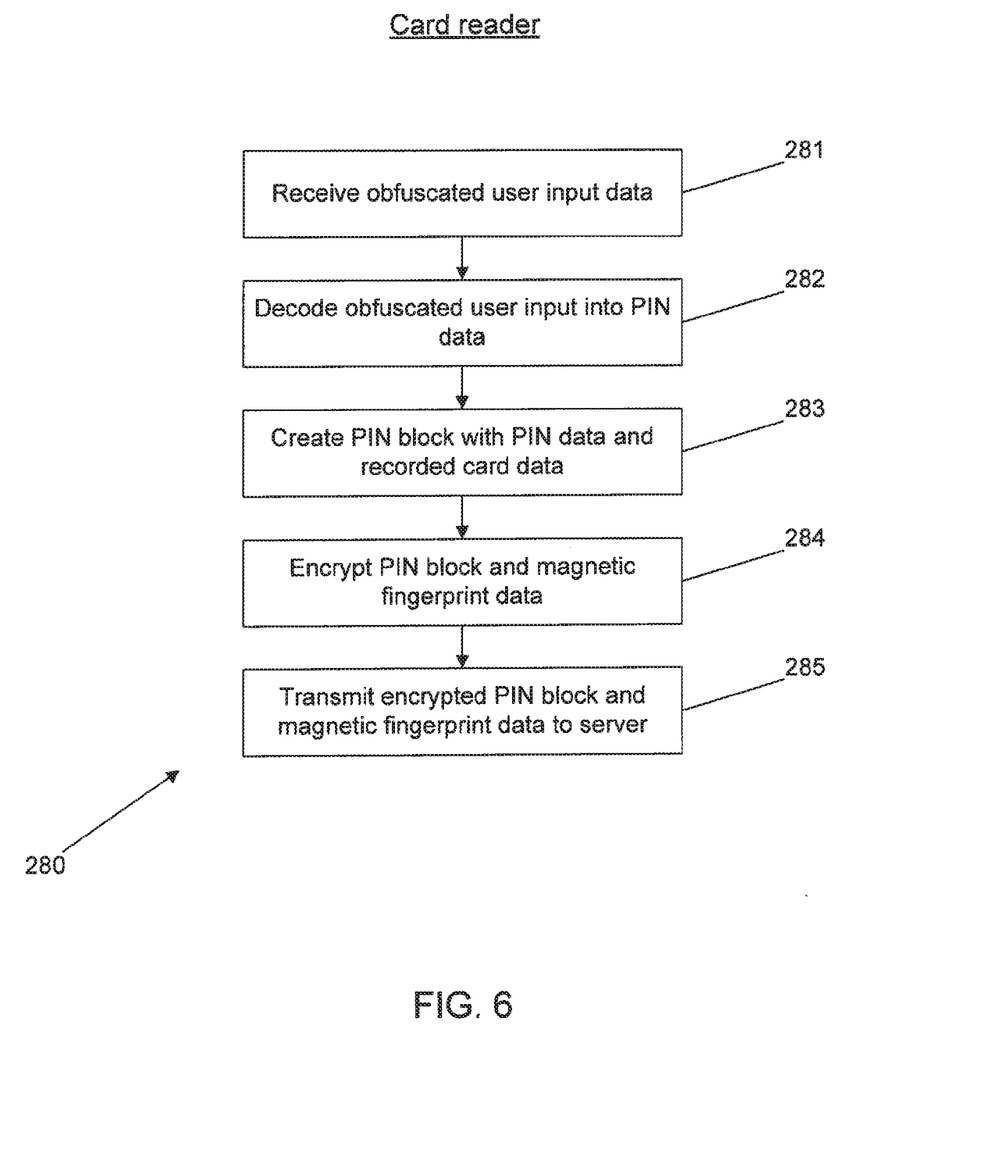
FIG. 6 is a flowchart depicting a subprocess that can be used with the general process of FIG. 3 for transmitting the PIN data and the card data to a server in accordance with one embodiment of the invention.

FIG. 6 is a flowchart depicting a subprocess 280 that can be used with the general process of FIG. 3 for transmitting the PIN data and the card data to a server in accordance with one embodiment of the invention. First, the card reader can receive (281) obfuscated user input data. The card reader can then decode (282) the obfuscated user input data into PIN data. In many embodiments, the card reader can decode the data by regenerating the scattergram that was displayed to the user by applying the same pseudo-random generator to the scramble code that was previously transmitted to the computer. The card reader can then use the scattergram with the received coordinate data to determine which numbers were selected by the user.

After decoding the user input data to recover the user's PIN, the card reader can create (283) a PIN block from the decoded PIN data and the data from the data card. In many embodiments, the reader can then authenticate this PIN block. In some embodiments, the card reader can authenticate the PIN block by verifying a checksum, by querying a local database, or by querying a remote database over a data connection. In some embodiments, the card reader can transmit the PIN block to the computer for retransmission. In many embodiments, the card reader can encrypt (284) the PIN block before transmitting it to the computer. In some embodiments, the card reader can encrypt (284) the PIN block and the magnetic fingerprint data. The encryption can be accomplished via any suitable cryptographic system, as are well known in the art, such as Triple Data Encryption Standard (DES) or advanced encryption standard (AES). The card reader can then transmit (285) the PIN block or the PIN block and the magnetic fingerprint data for authentication.

In one embodiment, the process can perform the sequence of actions in any order. In another embodiment, the process can skip one or more of the actions. In other embodiments, one of more of the actions are performed simultaneously. In some embodiments, additional actions can be performed.

Figure 7:
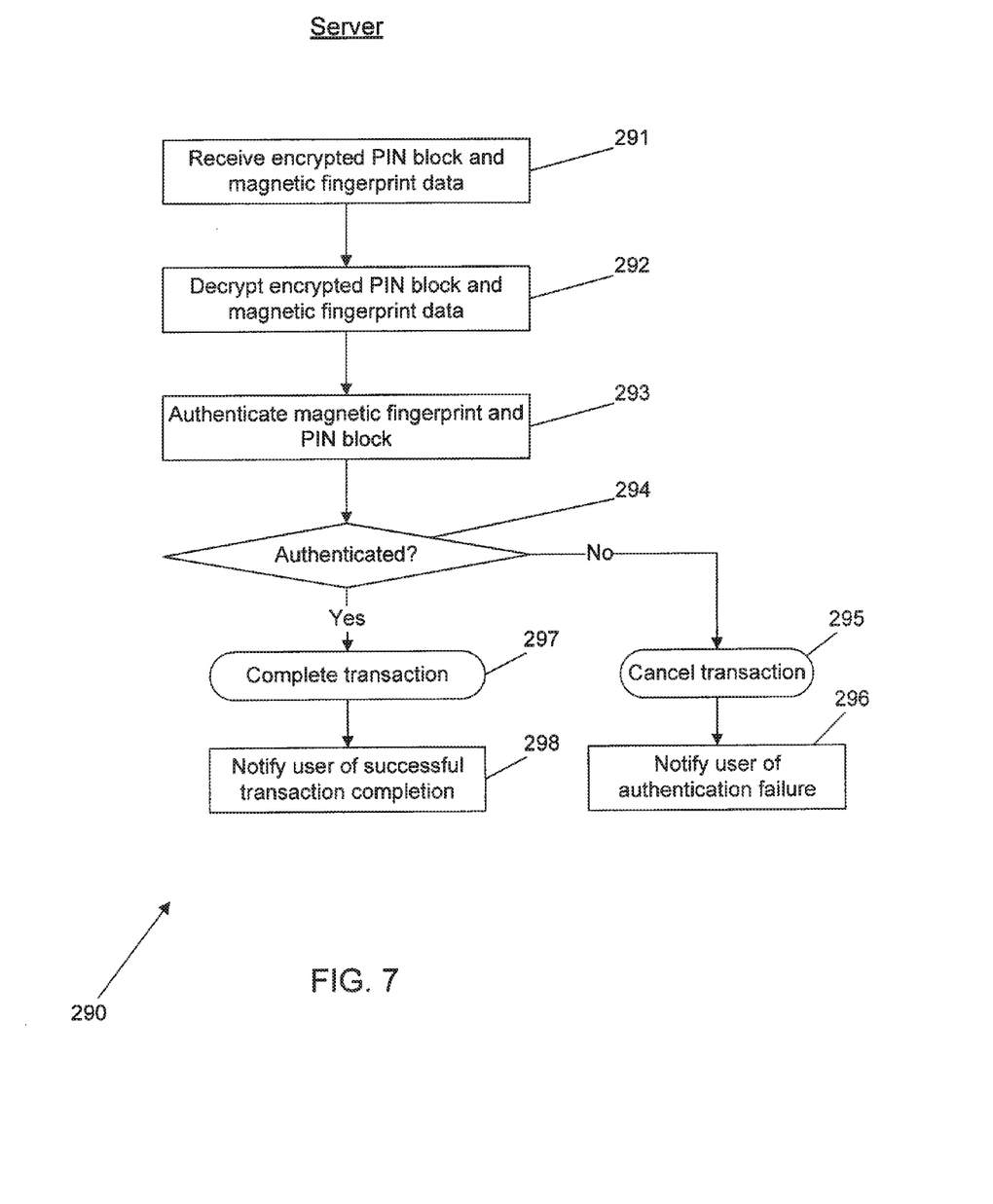
FIG. 7 is a flowchart depicting a subprocess that can be used with the general process of FIG. 3 for receiving and authenticating a PIN block and completing a transaction at a server in accordance with an embodiment of the invention.

FIG. 7 is a flowchart depicting a subprocess 290 that can be used with the general process of FIG. 3 for receiving and authenticating a PIN block and completing a transaction at a server in one embodiment of the present invention. First, the server receives (291) an encrypted PIN block and magnetic fingerprint data. The server then decrypts (292) the encrypted data using an encryption/decryption key known to both the server and card reader. The server then authenticates (293) the magnetic fingerprint and the PIN block. In one embodiment, the authentication process verifies that the magnetic fingerprint properly correlates to one in a database and that the fingerprint is valid (i.e., that the card has not been deactivated). The authentication process may also verify that the PIN stored in the PIN block and the magnetic fingerprint correlate with those associated with the account number in the PIN block. If any of these authentication actions fail, then the server can cancel (295) the transaction and notify (296) the user of the authentication failure. If the account data, PIN, and magnetic fingerprint are properly authenticated, the transaction can be completed (297) according to systems and methods well known in the field of PIN debit transaction processing. In such case, the server then notifies (298) the user of the successful completion of the transaction, such as by sending a message back to the computer.

In one embodiment, the process can perform the sequence of actions in any order. In another embodiment, the process can skip one or more of the actions. In other embodiments, one of more of the actions are performed simultaneously. In some embodiments, additional actions can be performed.

Embodiments of the invention provide systems and methods for conducting secure PIN debit transactions. While no system is completely impervious to malicious attacks, embodiments of the current invention can make it very difficult for an attacker to obtain confidential transaction information. In addition, several embodiments of the card readers described herein do not provide account numbers and magnetic fingerprint information in a non-encrypted form at any time to other machines such as the client computer or server. Thus, in several embodiments, in a worst case scenario, while significant protections exist by the obfuscation techniques described herein, an attacker might obtain a user's PIN. However, because the account numbers and the magnetic fingerprint information are not available in an unencrypted form, the acquired PIN will most likely be the only information obtained. The PIN without an associated account number or other relevant information is unlikely to be useful to the attacker. In such case, the systems and techniques described herein can provide robust protection against potential attackers and information thieves.

Variations, modifications, and other implementations of what is described herein will occur to those of ordinary skill in the art without departing from the spirit and the scope of the invention as claimed. Although the invention has been described with respect to certain embodiments, it should be recognized that the invention includes the claims and their equivalents as supported by this disclosure.

For example, the physical fingerprint of the data card need not be a characteristic of the magnetic stripe, but could instead refer to an intrinsic physical characteristic relating to optical, structural, or other permanent identifying characteristics.

As another example, the card reader could additionally include another authentication factor, such as a biometric scanner (e.g., fingerprint, iris, face, deoxyribonucleic acid (DNA), typing rhythm, and other personal physiological or behavioral characteristics) or a security token (e.g., a SecurID® token from RSA Security®).

As another example, the generation of the scramble code and the encryption of the PIN and card data need not be performed by the processor within the card reader, but either or both of these functions could be performed by a discrete encryption processor.

As another example, the card reader may transmit encrypted data or other data directly to an authentication server over a network using communications hardware built into the card reader itself such as over Ethernet, WiFi, Bluetooth, plain old telephone service (POTS), cellular, or other communications medium.

As another example, the system need not be limited to use with PIN debit systems, but may be used in other contexts where multi-factor authentication would be desirable, such as for controlling access to bank accounts, medical records, proprietary databases, and other private or restricted information or services.

As another example, the user PIN need not actually be a number, but may also contain letters or symbols.

As another example, the computer having a display may incorporate a screen reader display, as is commonly used with blind persons. The display may also provide a tactile representation of the data presented thereon instead of a visual representation.

What is claimed is:

1. A system for secure multi-factor authentication using dynamic data, the system comprising:
   a card reader; and
   a computer having a display,
   wherein the card reader is configured to:
      read card information from a data card, the card information comprising an account number;

generate and provide a scramble code to the computer based on the card information;
receive user input data indicative of user input responsive to a graphical numeric display based on the scramble code;
generate a personal identification number (PIN) data based on the user input data, wherein the PIN data is configured for use in multiple transactions;
generate a PIN block comprising the PIN data and the account number; and
transmit the PIN block for authentication.

2. The system of claim 1, wherein the computer is configured to:
receive the scramble code from the card reader;
display the graphical numeric display based on the scramble code;
receive user input data entered via the scramble code; and
transmit the user input data to the card reader;
wherein the user input data comprises encoded PIN data.

3. The system of claim 1, wherein the card reader is further configured to authenticate card data.

4. The system of claim 1, wherein the card reader is further configured to read biometric data.

5. The system of claim 1, wherein the card reader is configured to:
authenticate the data card; and
provide the scramble code to the computer only if the data card has been authenticated.

6. The system of claim 1, wherein the card information comprises:
an intrinsic physical characteristic; and
recorded data on the data card.

7. The system of claim 6, wherein the card reader is further configured to:
generate a fingerprint based on the intrinsic physical characteristic; and
authenticate the data card based on the fingerprint.

8. The system of claim 7, wherein the card reader is further configured to:
encrypt the fingerprint; and
transmit the fingerprint for authentication.

9. The system of claim 8, further comprising a server configured to:
decrypt the fingerprint; and
authenticate the fingerprint.

10. The system of claim 1, wherein the card reader is further configured to encrypt the PIN block.

11. The system of claim 1, further comprising a server configured to:
authenticate the PIN block; and
process a transaction using the PIN block.

12. A method for secure multi-factor authentication using dynamic data, the method comprising:
reading, at a card reader, card information from a data card, the card information comprising an account number;
generating and sending, at the card reader, a scramble code based on the card information to a computer having a display;
receiving, at the card reader, user input data indicative of user input responsive to a graphical numeric display based on the scramble code;
decoding, at the card reader, personal identification number (PIN) data from the user input data, wherein the PIN data is configured for use in multiple transactions;
generating, at the card reader, a PIN block comprising the PIN data and the account number; and
transmitting, at the card reader, the PIN block for authentication.

13. The method of claim 12, further comprising:
displaying, at the computer, the graphical numeric display based on the scramble code, wherein the graphical numeric display comprises a virtual PIN pad; and
receiving, at the computer, the user input data entered via the virtual PIN pad, wherein the user input data comprises encoded PIN data.

14. The method of claim 12, wherein the card information comprises:
an intrinsic physical characteristic; and
recorded data on the data card.

15. The method of claim 14, further comprising:
generating, at the card reader, a fingerprint based on the intrinsic physical characteristic; and
authenticating, at the card reader, the data card based on the fingerprint.

16. The method of claim 15, further comprising:
encrypting, at the card reader, the fingerprint; and
transmitting, at the card reader, the fingerprint for authentication.

17. The method of claim 16, further comprising:
decrypting, at a server, the fingerprint; and
authenticating, at the server, the fingerprint.

18. The method of claim 12, further comprising encrypting the PIN block.

19. The method of claim 12, further comprising:
authenticating, at a server, the PIN block; and
processing, at the server, a transaction using the PIN block.

20. The method of claim 12, further comprising:
authenticating, at the card reader, the data card;
wherein the sending, at the card reader, the scramble code to the computer having the display comprises sending, at the card reader, the scramble code to the computer having the display only if the data card has been authenticated.

* * * * *